United States Patent
Lee et al.

[11] Patent Number: 6,045,332
[45] Date of Patent: Apr. 4, 2000

[54] CONTROL SYSTEM FOR MULTI-PUMP OPERATION

[75] Inventors: Shu-Yee Lee; James Murlin Cawood, both of Houston; Michael William LeBlanc, Missouri City, all of Tex.

[73] Assignee: Celanese International Corporation, Dallas, Tex.

[21] Appl. No.: 09/075,503

[22] Filed: May 8, 1998

[51] Int. Cl.[7] .................................................. F04B 41/06
[52] U.S. Cl. ................... 417/5; 137/565.16; 137/565.33; 417/47
[58] Field of Search ................ 417/5, 7, 47; 137/565.11, 137/565.16, 565.33

[56] References Cited

U.S. PATENT DOCUMENTS

| | | | |
|---|---|---|---|
| 3,775,025 | 11/1973 | Maher, Jr. et al. | 417/7 |
| 3,872,887 | 3/1975 | Wohlrab | 137/567 |
| 4,428,529 | 1/1984 | Bentsen | 236/49 |
| 4,686,086 | 8/1987 | Rowe | 422/111 |
| 5,259,731 | 11/1993 | Dhindsa et al. | 417/3 |
| 5,360,320 | 11/1994 | Jameson et al. | 417/4 |
| 5,522,707 | 6/1996 | Potter | 417/4 |
| 5,566,709 | 10/1996 | Fujii et al. | 137/487.5 |

FOREIGN PATENT DOCUMENTS

| | | | |
|---|---|---|---|
| 58-27893 | 2/1983 | Japan | 417/5 |

Primary Examiner—Tony M. Argenbright
Attorney, Agent, or Firm—M. Susan Spiering

[57] ABSTRACT

A control system, particularly adaptable to multiple-pump operations in process units, is disclosed. A measured variable, such as pressure, is sensed by a master controller. The master controller, in turn, sends a signal to the driver of the individual pumps or in other ways regulates the output of the two pumps. The master controller is configured to send different signals simultaneously to the two pumps in response to a change in the measured variable. The result is that the response time of one of the pumps is faster than the other. Thus, minor deviations from the desired setpoint of the measured variable are primarily responded to by the pump configured to react faster. Dramatic upsets, resulting in a significant deviation from the desired setpoint for the measured variable, allow one pump to react fast and change its capacity dramatically to bring the measured variable back to the desired setpoint, while the other pump responds more slowly and thus maintains a reasonable forward fluid flow-rate all the time to prevent a process unit shutdown. On sensing a loss of the fast-responding pump the master controller automatically speeds up the response time of the slowly responding pump so that its capacity can be varied reasonably fast enough to maintain the measured variable at the target condition. By use of differing response times on the pumps, the tendency of the pumps to fight each other when operated by steam turbines, for example, is eliminated. Additionally, the pumps with the control system can quickly respond to large process upsets without triggering shutdown conditions of both pumps which would otherwise cause a processing unit shutdown.

23 Claims, 3 Drawing Sheets

Time from 8 : 00 AM to 8 : 00 PM on 7 / 20 / 97

Time from 8 : 00 AM to 8 : 00 PM on 7 / 20 / 97

6,045,332

CONTROL SYSTEM FOR MULTI-PUMP OPERATION

FIELD OF THE INVENTION

The field of this invention relates to automatic control systems applicable to multi-pump operations in process systems.

BACKGROUND OF THE INVENTION

In large-scale manufacturing complexes to produce basic or specialty chemicals, numerous materials are provided into a vessel for a desired reaction. Changes in one of the feedstreams affects the flowrates of the other streams. To permit maintenance and reduce plant downtime, pumps are normally redundant so that one serves as a spare while the other is operating to provide one of several flow streams to a reactor vessel, for example. When only a single pump is running, an automatic control system can be tuned to the system dynamics so that it responds cleanly and within the desired timeframe to input changes from a controller. Typically, in large manufacturing operations, the 2-pump arrangement comprises a pair of identical centrifugal pumps whose output and discharge pressure varies in a predetermined manner on the basis of pump speed, as indicated by available pump curves from the pump manufacturer.

Such process pumps can be driven by electric motors or other types of drivers, such as steam turbines.

In many situations, the capacity of manufacturing plants is increased years after they are originally built for a given capacity. As part of such throughput increase or debottlenecking, higher flowrates are required of the constituent components, for example, that would go into a reactor vessel. When these situations arise, one alternative is to simply purchase larger pumps to handle the higher throughput and continue the old way of operating, with one pump running and the other sitting idle as a spare. However, reconfiguring the piping, foundations, utilities and the associated downtime can make such a changeover to larger-capacity pumps economically unattractive. Instead, in many chemical processing plants, the decision has been made to run the main and spare pumps together. These pumps are piped in parallel with the objective being that they share the new and higher throughput rates required. When these pumps are driven by turbines, a common plant practice, and are operated simultaneously, control problems arise in unequal responses to governor valve movements associated with each of the turbine drivers. Thus, to modulate two pumps running simultaneously, each having its own controller for positioning the steam inlet valve to a turbine driver, a situation of pumps fighting each other occurs as a flow correction to the steam flow to one of the turbines changes the output of its associated pump and changes the steam flow requirements to the other turbine connected to a common manifold in order to compensate. The steam valves have their own structural features which could affect their rates of movement, such as friction in the actuation assembly or the valve mechanism itself. This continual correction between the governor valves can eventually result in unstable turbine operation or high vibration measured at one or both of the turbines, which could result in an automatic shutdown. Additionally, the two pumps, when both operating in automatic mode, may not respond well to large changes in the measured variable which call for, for example, a sudden decrease in total pump output from both pumps. In prior systems, a master controller controlling the steam flow to the individual pumps would attempt to rapidly reduce the output of both pumps. Depending on the size of the upset, the drastic reduction in output could result in opening of a minimum flow recycle valve on both of these pumps, resulting in a major loss of forward fluid flowrate and, ultimately, the complete shutdown of the pumps and the processing unit. This, of course, is undesirable.

Thus, one of the objectives of the present invention is to provide a control system for multiple pumps connected in parallel which prevents them from fighting each other during normal deviations from a desired setpoint for a measured variable. On the other hand, another objective is to make the control system able to respond to dramatic changes in the measured variable without a loss of both pumps and, hence, a process unit shutdown.

The objectives of the present invention have been addressed by allowing a master controller to present different output signals to the various pumps in response to a change in the measured variable. As a result, the performance change in response to a change in the measured variable in one pump is different than the other. This solution enables the pumps to run together automatically without fighting and further enables them to respond to dramatic changes in the measured variable. The prior pump control systems which are known do not address this problem. Typical of such prior control systems for pumps or applicable to them are U.S. Pat. Nos. 5,566,709; 5,522,707; 5,360,320; 5,259,731; 3,872,887; 3,775,025; 4,686,086; and 4,428,529.

SUMMARY OF THE INVENTION

A control system, particularly adaptable to multiple-pump operations in process units, is disclosed. A measured variable, such as pressure, is sensed by a master controller. The master controller, in turn, sends a signal to the driver of the individual pumps or in other ways regulates the output of the two pumps. The master controller is configured to send different signals simultaneously to the two pumps in response to a change in the measured variable. The result is that the response time of one of the pumps is faster than the other. Thus, minor deviations from the desired setpoint of the measured variable are primarily responded to by the pump configured to react faster. Dramatic upsets, resulting in a significant deviation from the desired setpoint for the measured variable, allow one pump to react fast and change its capacity dramatically to bring the measured variable back to the desired setpoint, while the other pump responds more slowly and thus maintains a reasonable forward fluid flowrate all the time to prevent a process unit shutdown. On sensing a loss of the fast-responding pump, the master controller automatically speeds up the response time of the slowly responding pump so that its capacity can be varied reasonably fast enough to maintain the measured variable at the target condition. By use of differing response times on the pumps, the tendency of the pumps to fight each other when operated by steam turbines, for example, is eliminated. Additionally, the pumps with the control system can quickly respond to large process upsets without triggering shutdown conditions of both pumps which would otherwise cause a processing unit shutdown.

DETAILED DESCRIPTION OF THE PREFERRED EMBODIMENT

Figure 1:
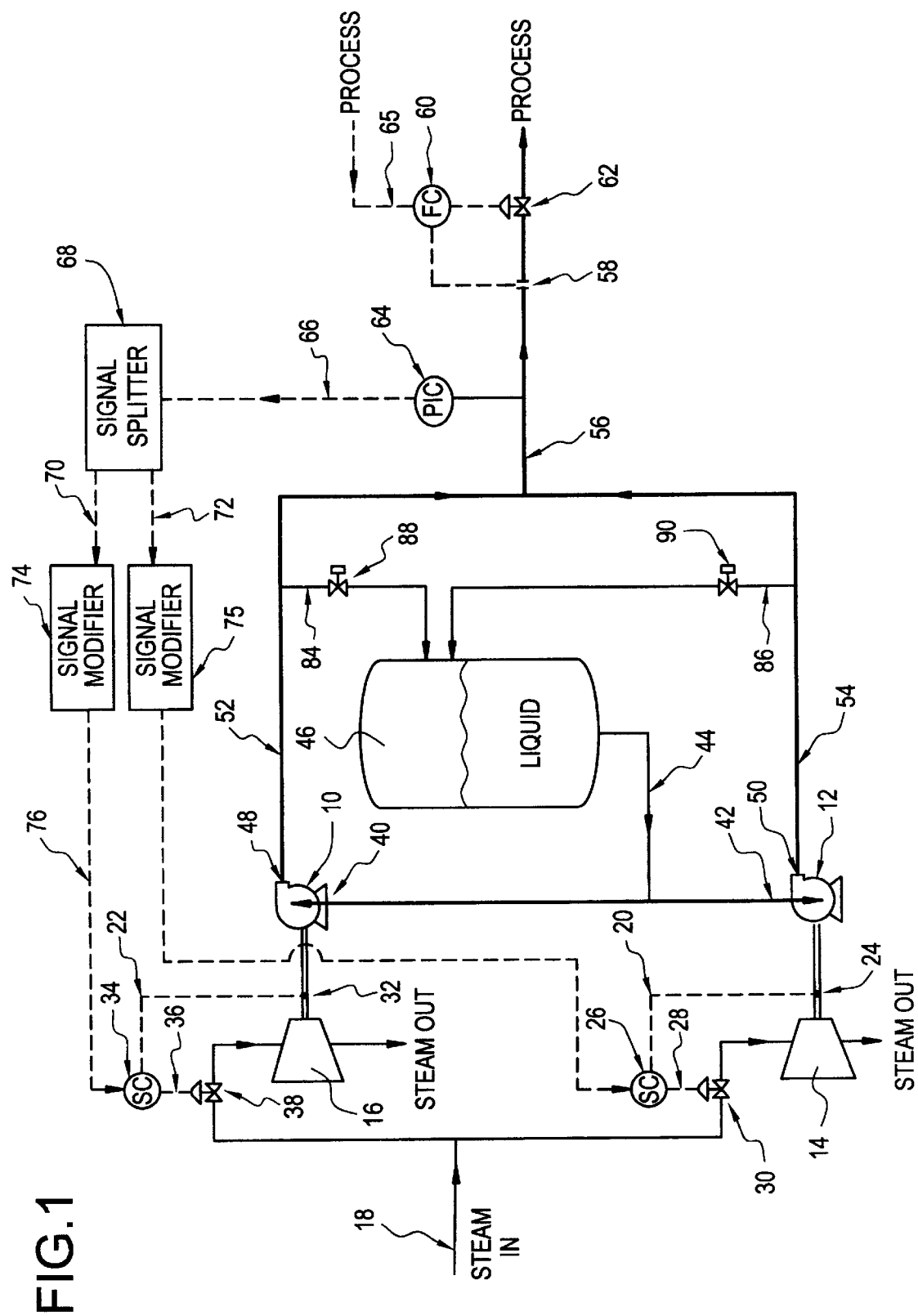
FIG. 1 is a schematic of one application of the invention, showing the preferred embodiment where the measured variable is pressure and the capacity of the pumps running in parallel is regulated by individual speed control loops which regulate steam flow on a steam supply line to each of the turbine drivers.

The control system of the preferred embodiment is illustrated in FIG. 1. As seen in FIG. 1, pumps 10 and 12 are driven, respectively, by turbines 16 and 14. A steam supply line 18 provides steam to turbines 14 and 16. Each of the turbines 14 and 16 has a speed control loop 20 and 22, respectively. Speed control loop 20 has a sensor for the turbine speed, shown schematically as 24. A controller 26 provides an output signal 28 to the steam control valve 30. Similarly, a speed sensor, shown schematically as 32, provides a signal to controller 34, which in turn sends a signal 36 to the steam control valve 38. The pumps 10 and 12 have respective suction lines 40 and 42 connected together to line 44 and ultimately into vessel 46, which is part of the process system. Pumps 10 and 12 have respectively discharge connections 48 and 50 to which are connected discharge lines 52 and 54, respectively. Lines 52 and 54 come together into line 56, which is the main discharge line from both pumps 10 and 12 back into the process. Located on line 56 is a flow sensor 58 which connects to a flow controller 60, which in turn operates a flow control valve 62. A signal 65 comes from the process so that the flow in line 56 can be coordinated with other flows for the need of the process. Upsets can occur when these other flows are changed or interrupted which results in a change of the setpoint of the flow controller 60, which in turn changes the sensed pressure at pressure-indicating controller 64. Thus, for example, if less flow is required in line 56, the flow controller 60 responds by closing valve 62, which increases the pressure in line 56. That increase in pressure is sensed by the pressure-indicating controller 64. The control system can operate with a variety of measured variables without departing form the spirit of the invention.

Figure 2:
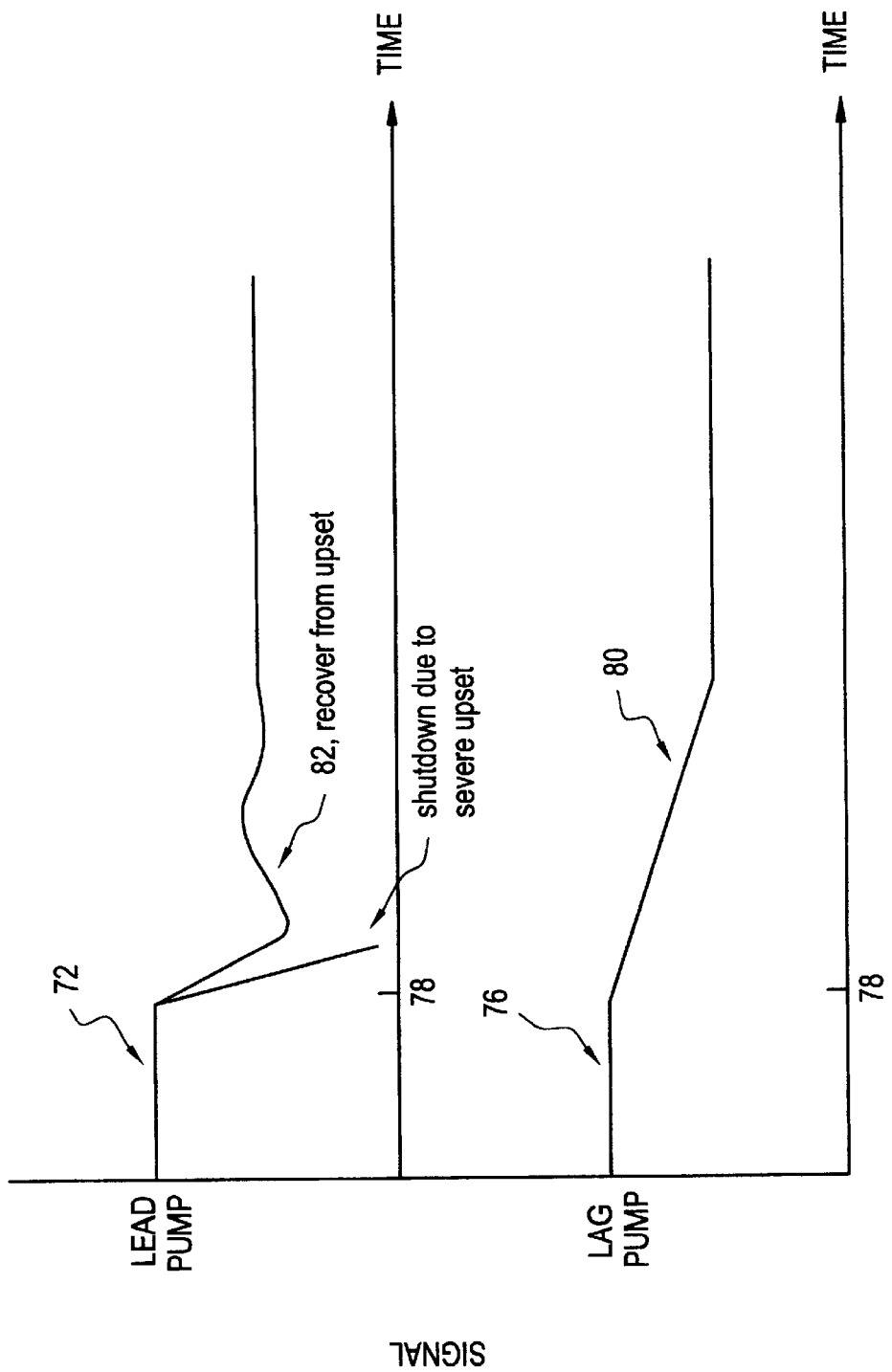
FIG. 2 is a schematic representation of the output signals of the primary controller delivered to the secondary controllers.
Figure 3:
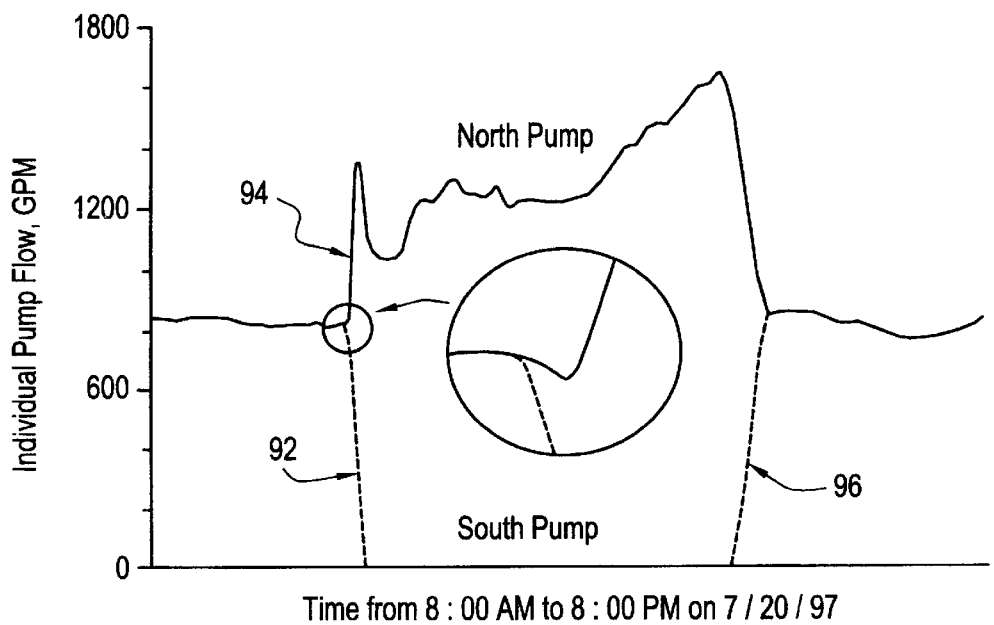
FIG. 3 represents the performance of the two pumps, indicating output flow charted against time during a process upset for each of the two pumps.

Pressure-indicating controller 64 provides an output signal 66 to a signal splitter 68. The signal splitter 68 takes the single signal 66 from pressure-indicating controller 64 and produces two identical output signals 70 and 72. Signal 72 goes directly to controller 26 and bypasses signal modifier 75, while signal 70 goes through a signal modifier 74, which in turn modifies the signal 70 into an output signal 76. This occurs because pump 12 is selected as the lead pump while pump 10 is selected as the lag pump. The opposite selection can be made, in which case signal 72 would go to signal modifier 75 while signal 70 would bypass signal modifier 74. Signal 76 goes to controller 34. FIG. 2 illustrates what occurs when a pressure increase is sensed by pressure-indicating controller 64 due to closure of valve 62 in response to a process input to flow controller 60. In FIG. 2, the lag pump refers to pump 10, while the lead pump refers to pump 12. These pumps are given these names because of the way they respond to a change in the measured variable, which in this illustrated preferred embodiment is pressure. FIG. 2 illustrates the signals 72 and 76 and their change per unit time. In the initial segment of both graphs for the lag and lead pumps, the signals 72 and 76 are essentially constant. At a time frame indicated by 78, the sensed pressure variable in line 56 significantly increases, calling for a decrease in output from pumps 10 and 12. A significant change is a deviation from the setpoint of more than 10%, for example. The signal 72 given to pump 12 dramatically decays in response to a pressure increase in line 56. The sloped segment 80 schematically represents a gradual decay in the signal 76 provided to controller 34, which ultimately controls valve 38. The more gradual the slope of segment 80 in FIG. 2, the slower the response time of the control loop 22 and, in turn, the slower the change in capacity to pump 10 in response to a change in the measured variable, i.e., the pressure in line 56. The change in pressure in line 56 may also be sufficiently severe so as to cause the lead pump to shut down or, alternatively, the overall control system can recover, as indicated in FIG. 2, where segment 82 indicates a further response in signal 72 so that ultimately, the controlled pressure is regulated by the two pumps 10 and 12 sharing the load, as indicated by the horizontal line segments at the right end of FIG. 2 for both pumps. It should be noted that the output of the lag pump 10 will change but at a slower rate than pump 12. The measured variable of pressure sensed by controller 64 may actually increase the output of the lag pump 10 to compensate for the rapid capacity decay from the lead pump 12. FIG. 3 illustrates this behavior. It shows the output of the lead pump 12 dropping dramatically, with the result being an opening of its minimum flow recycle valve 90 and its ultimate manual shutdown by the operator. The output of the lag pump 10 drops a little bit in the beginning and then actually increases to meet the need to bring the pressure in line 56 to the setpoint. The change in output of the lag pump 10 is slower than lead pump 12 before the loss of the lead pump. This prevents simultaneous capacity reduction of both pumps in response to a pressure increase in line 56 which would occur if the two pumps are both running in automatic mode and there is no lag compensation block 74 operating on the lag pump 10. The change in output of the lag pump automatically becomes as fast as the former lead pump on sensing reduction of flow, opening of a minimum flow recycle valve or loss of the lead pump. As a result, the lag pump can react fast enough to compensate for a sudden loss of forward fluid flow caused by the shutdown of the lead pump.

Referring to pumps 10 and 12, discharge lines 52 and 54 have, respectively, recycle lines 84 and 86 extending therefrom. Recycle valves 88 and 90, respectively, are located on recycle lines 84 and 86. Ultimately, recycle lines 84 and 86 go back to vessel 46. When the output of the pumps 10 or 12 is sufficiently low, the respective recycle valve 88 or 90 opens to avoid damage to the pump from long periods of operation at low outputs. The preferred embodiment incorporates centrifugal pumps as pumps 10 and 12, although other pumps can be used without departing from the spirit of the invention.

As previously described, in holding a desired setpoint for pressure in line 56, a situation can arise where the pumps 10 and 12 fight each other because of uneven movements of control valves 30 and 38. To respond to minor variations from setpoint in controller 64, simultaneous signals to the control loops 20 and 22, in the absence of a signal modifier 74, also known as a lag compensation block, may result in uneven control valve movements as one valve 30, for example, responds more quickly than valve 38. This situation can arise even though the signal received by the speed controllers 26 and 34 is identical. When the uneven valve movements occur, it will cause differential turbine speed and thus output from the pumps. At the same time, changing the steam flow to one of the turbines simultaneously affects the steam flow to the other turbine because steam comes from a common manifold. As a result, further correction is needed to bring the turbines' speed and measured variable back to the desired setpoints.

This continual resetting or hunting by the control valves 30 and 38 can result in unstable operation of the turbines 14 and 16. In situations where vibration sensors are mounted to the turbines 14 and 16, the vibrations in the turbines can reach sufficient levels to force a shutdown of the turbines and, hence, the process unit. Thus, the problem of fighting between the pumps 10 and 12, due to out-of-phase movements of control valves 30 and 38 in response to a given control command, is an undesirable characteristic which is solved by the lag compensation block 74. With the lag compensation lock 74, the operation of pump 10 is sufficiently slowed so that minor deviations from the desired setpoint of pressure in line 56, as sensed by the controller 64, do not affect the operation of valve 38 to a meaningful degree. While eventually there may be some change in valve position of valve 38, the response of the control system to regulate the setpoint of pressure in line 56, as selected in controller 64, is to have the leading pump 12 respond more quickly to measured variable changes. Even when the system is operating at steady conditions, the tendency of the pumps to fight each other is eliminated by use of a lag compensation block 74 because the sensitivity of pump 10 is reduced. With a slower response time for the control in control loop 22, fighting is no longer an issue because minor changes in valve position in valve 38 no longer have any significant immediate effect on the system overall. With the responsiveness of control loop 22 having been slowed to less than the speed of response of control loop 20, minor blips above or below the setpoint of controller 64 are mainly regulated by movements of valve 30. Even steady operations at a control pressure as set by controller 64, with the use of the lag compensation block 74, eliminates the problem of fighting between the pumps 10 and 12 during normal operation.

Should there be a sudden decrease in the demanded flow in line 56, the controller 60 will move valve 62 toward its closed position. This, in turn, will be sensed as a pressure rise in line 56 by controller 64. Again, in previous systems without the lag compensation block 74, both pumps would respond similarly as control loops 20 and 22 called for simultaneous closure of valves 30 and 38, respectively. Depending on the degree of the upset, both pumps 10 and 12 could approach their minimum flow values which would trigger the opening of recycle valves 88 and 90. This would deprive the process of the requisite flow necessary even at low rates of operation, and the process could be shut down. To avoid loss of both pumps and to allow the system to respond to dramatic changes in the demand (i.e., step changes of greater than 10%, for example), the lag compensation block 74 is inserted into the control system. With the lag compensation block 74 in place, too much flow in line 56, sensed as a dramatic increase in pressure at controller 64, will result in the lead pump 12 dramatically reducing its output, while, due to the modification of signal 76 for the lag pump, as illustrated in FIG. 2, the responsiveness of the control loop 22 for the lag pump 10 will be significantly slower. Thus, the lag pump 10 will maintain a certain forward fluid flow in line 56, preventing a processing unit trip. The flow demand could be so reduced in line 56 that the lead pump may actually have its recycle valve 90 opened or may go offline. If that occurs, the operator can continue to meet the demand in line 56 with the lag pump. The operator can manually shut down the lead pump 12 at this time. When the lead pump is manually shut down or automatically tripped out, the master controller 64 will designate the lag pump 10 as the new lead pump immediately. Doing this will bypass the block 74 and allow pump 10 to control the pressure in line 56 but with now a faster response than when it was selected as the lag pump.

Those skilled in the art can appreciate that the designation of which pump is lag and which pump is lead can be reversed, based on known control system techniques without departing from the spirit of the invention. Additionally, any one pump can be operated in automatic operation by controller 64 while the other pump is idle. This can occur at low operating rates for the process system or if maintenance is required on one of the pumps 10 or FIG. 3 indicates the performance of pumps 10 and 12 in output in gallons per minute for the control system. As indicated in FIG. 3 both pumps are operating at a little over 800 gallons per minute when a dramatic decrease in flow demand by the process in line 56 occurs, which raises the measured pressure at controller 64. Line 92 indicates that the lead pump 12 output dramatically goes to zero in response to the upset, while the output of the lag pump 10, which responds more slowly, decreases a little bit in the beginning and then increases at a rate comparable to the decrease in capacity of pump 12, up to approximately 1400 gallons per minute, as indicated by line 94. The process then operates using only the lag pump 10 for many hours. During this time, the lag pump 10 is redesignated automatically to lead status, which bypasses block 74. Pump 12 is later restarted, as indicated by line 96. As pump 12 comes on with additional capacity, control loop 22 responds and decreases the output of the pump 10 until the flows are matched, as indicated in the right end of FIG. 3. Pump 12 comes on as the lag pump, with block 75 modifying its signal while pump 10 is now the lead pump.

Figure 4:
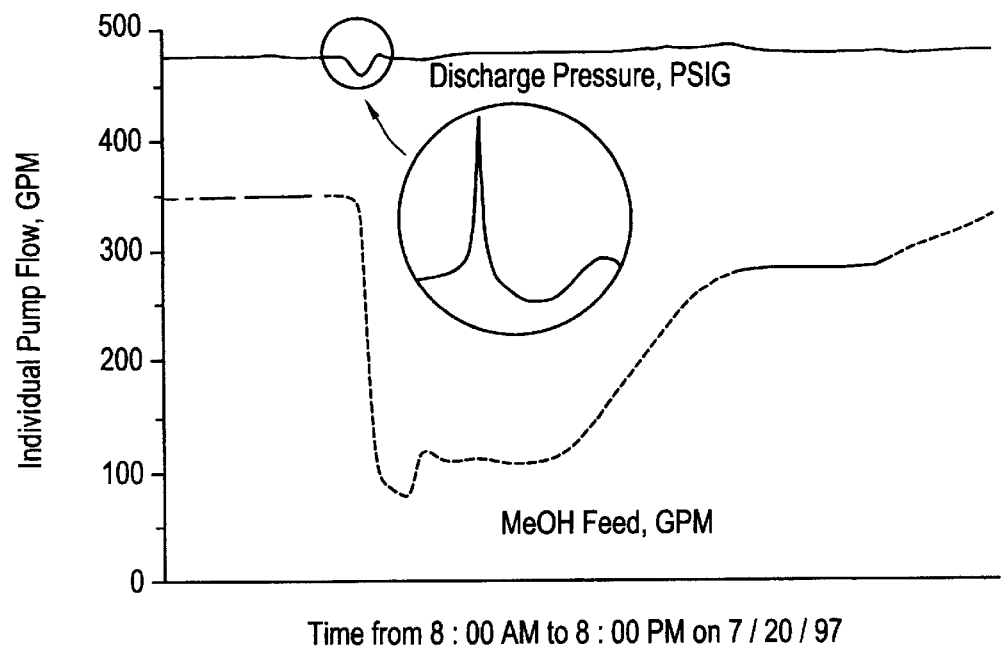
FIG. 4 illustrates the measured changes in the controlled variable per unit time in response to a change in flowrate in another part of the processing plant which affects the measured variable.

At the top of FIG. 4, the sensed pressure at controller 64 is plotted over the same time period. FIG. 4 indicates a significant pressure spike around the time of the upset which caused controller 64 to alter the performance of pumps 10 and 12. A small pressure dip following the pressure spike is caused by a loss of the then lead pump 12. As can be seen from FIG. 3, the output of the lag pump 10 actually drops slowly in the beginning and then increases rapidly. The size of the upset is seen schematically at the bottom of FIG. 4. The reference to the bottom graph on FIG. 4 is to a feed rate of, in this case, methanol, which, in turn, by a ratio controller controls the flowrate in line 56 through the use of controller 60. Thus, the magnitude of the methanol feed decrease is fairly substantial but of relatively short duration. FIGS. 3 and 4 collectively show the system response of the pumps 10 and 12 to this degree of upset. As can be seen by the pressure versus time chart in FIG. 4 for line 56, a very minor pressure disturbance occurs, chiefly due to a sudden loss of the forward fluid flow from the lead pump and the use of the lag compensation block 74. In this particular example, the order of magnitude of the methanol feed rate cut was from 350 gallons per minute to about 80 gallons per minute, and the control system responded to proportionately decrease the flow in line 56 without shutting the unit down.

Those skilled in the art can plainly see that the control system allows for a low-cost debottlenecking of existing plants which were designed to have one pump running with another sitting idle as a spare. Rather than reconfigure the pumps and drivers to accommodate greater throughputs, the main pump and spare can be run in tandem in automatic mode without fighting each other, while also having the capability of responding to dramatic process upsets. The control system as described above is capable of response to substantial deviations of the desired setpoint of the controlled variable, i.e., the pressure in line 56. Thus, for example, where the flow controller 60 responds to another flowrate within the process plant on a ratio of flow basis, the entire control system can respond to a total output decrease of, for example, from 1650 gallons per minute to 1300 gallons per minute on a very abrupt basis. The control system has the versatility to allow the two pumps 10 and 12 to run in parallel and to survive unit upsets, such as due to process changes which result in position changes of valve 62 or the loss of one of the two pumps 10 or 12. The control system further allows the flows to be balanced from the pumps 10 and 12 and allows individual start up of the pumps 10 and 12, as well as individual shutdown. Finally, the control system also provides for changing over from one pump to the other without upsets in the process.

In operation of the control system, the process operator designates a specific pump as the lead and the other pump as the lag. In order to make sure that either pump can function as lead or lag, a lag compensation block 75, similar to lag compensation block 74, is connected to signal 72. Depending on which pump is selected as lead or lag, one or the other of the output signals 70 and 72 will bypass one of the blocks 74 and 75, which results in one controller 20 or 22 having a relatively small lag time for quicker response, while the other having a longer lag time for slower response. The lead pump responds faster than the lag pump so that the lag pump is unaffected by process disturbances which cause minor pressure fluctuations from setpoints of the measured variable. The lag pump moves slowly and works in conjunction with controller 64 to hold the balance of the flows from the two pumps during normal operation. In this situation, the lag pump is not sensitive to these minor pressure fluctuations in line 56. Thus, small corrections can be made by pump 12, in some situations before pump 10 ever reacts. The control system is set up so that when a large upset occurs, the highest priority is to maintain the discharge pressure in line 56 and a reasonable forward fluid flow all the time to avoid a unit trip. Attempts to balance the flows from pumps 10 and 12 at that time are suspended because it would result in the deterioration of the controllability of the system. If one of the pumps 10 or 12 trip out, the control system automatically switches from dual-pump operation to one-pump operation.

With the control system in place, the lag pump is not influential enough in effecting the lead pump operation and even though there is some out-of-phase movement of the governor valves, pump fighting as a result of such out-of-phase movements is no longer a concern. In the event of a large upset in the process, such as a sharp pressure rise sensed by controller 64, the lead pump slows down first until its minimum flow valve opens. At this time the secondary pump or lag pump will slow down slowly and thus will not open its minimum flow valve because of the lag compensation block associated with it. Because the lead pump's capacity decays quickly before and further decays after the minimum flow valve opens, the process suddenly loses a significant amount of the capacity of the pump system, which in turn prevents the lag pump from moving toward its minimum flow shutdown point. Instead, the lag pump can actually increase its capacity. With automatically designating the lag pump as the new lead pump at this point of time, the new lead pump can increase its capacity at a rate comparable to the decay of output of the old lead pump in order to control line 56 pressure. Thus, the control system prevents both pumps from opening their minimum flow valves at the same time, which would result in a process unit trip.

The tuning of the lag compensation blocks for the lag pump has to be done in conjunction with the system operating requirements. If the lag pump response is too slow, it becomes almost a situation where the lag pump is on manual operation. On the other hand, if the response time of the lag pump is too fast, then the problem of pump fighting and inability to control during process upsets will return. Thus, the setting of the lag compensation block for the lag pump has to be accomplished by tuning in the actual process system. The tuning of such a system is a task that is well-known to those skilled in the art. The control system is configured to automatically switch from one pump to the other on automatic operation in the event of a trip on one of the pumps, regardless of whether that pump is then designated as lead or lag. In response to a process upset, such as a rise in pressure in line 56 requiring a capacity cut in the pumps, the lead pump responds quickly in reducing its capacity while the lag pump reduces its capacity at a slower rate or may, in fact, increase its capacity as the lead pump dramatically decreases its capacity. If the rate cut is sufficiently great on the lead pump, it could trigger the opening of the minimum flow valve back to vessel 46, in which case the relatively sluggish lag pump would attempt to control the desired pressure in line 56. When such a situation occurs and the lead pump is not shut down immediately, the discharge pressure control in line 56 may become sluggish and unsatisfactory. The lead pump may open or close its minimum flow valve alternatively and, thus, upset the unit. When this occurs, the operator will generally bring down the lead pump and the master controller 64 will automatically select the lag pump as the main pump for one-pump automatic operation. If the operator does not make this change, the discharge pressure control in line 56 can deteriorate to the extent that the unit will trip out. Looking at FIG. 3, this procedure is illustrated where the lead pump is shut down, as indicated by line 92, and later brought up, as indicated by line 96.

Those skilled in the art will appreciate that after an upset with one pump taken off the line and the lag pump selected for one-pump automatic operation the lag compensation block associated with that pump will not be necessary since only one pump is operating.

The disclosed control system solves the problem of pumps fighting each other in dual-pump operations in process plants. The control system is applicable to other types of equipment running in parallel, which is individually controlled in response to changes in a measured variable in the process system and is not limited to steam turbine-driven centrifugal pumps, as indicated in the preferred embodiment. Other types of drivers or capacity control are also within the scope of the invention. The control system can control two or more pumps running simultaneously, as long as at least one is leading and another is lagging.

The foregoing disclosure and description of the invention are illustrative and explanatory thereof, and various changes in the size, shape and materials, as well as in the details of the illustrated construction, may be made without departing from the spirit of the invention.

We claim:

1. A pump control system for fluid delivery with a plurality of pumps in simultaneous parallel operation, comprising:

a primary controller to measure a controlled variable and send a plurality of different output signals;

a secondary controller mounted to each of a plurality of said pumps to control their performance, wherein a different signal is given to different secondary controllers so that the response of one of the operating pumps to a variation of the controlled variable is different than the response of another operating pump.

2. The control system of claim 1, wherein:

one of said signals is altered by a lag compensation block which makes said secondary controller associated with said altered signal respond slower than another said secondary controller.

3. The control system of claim 2, wherein:

said primary controller further comprises a signal splitter which takes a single signal responsive to measurement of said controlled variable and sends a plurality of identical signals.

4. The control system of claim 3, wherein:

said lag compensation block alters at least one of said identical signals from said splitter.

5. The control system of claim 2, wherein:

said lag compensation block results in a more gradual change in signal strength per unit time emerging from said lag compensation block than another signal which is unmodified by a lag compensation block.

6. The control system of claim 5, wherein:

one pump's slower response to measured variable changes prevents two pumps which are running simultaneously from fighting each other.

7. The control pump of claim 6 wherein:

the pump affected by said lag compensation block responds too slowly to small changes in said measured variable so that another pump which receives a direct signal from said primary controller, in effect is the pump which substantially responds to such measured variable changes.

8. The control system of claim 2 wherein:

the pump which receives said altered signal responds more slowly to change its output than another pump which receives an unaltered signal in the event of a substantial change to said measured variable preventing shutdown of both pumps at the same time.

9. The control system of claim 8, wherein:

the pump which receives the unaltered signal rapidly reduces its output flow responsive to a substantial change in said measured variable until a minimum flow valve opens, while at the same time the pump which receives the altered signal alters its flow output more slowly to maintain a reasonable forward fluid while bringing said measured variable to a desired value.

10. The control system of claim 1, wherein:

one pump's slower response to measured variable changes prevents two pumps which are running simultaneously from fighting each other.

11. The control system of claim 1, wherein:

in response to a substantial change in said measured variable, the pump which responds faster rapidly changes its output to control the measured variable while the slower-responding pump gradually alters its output to maintain a reasonable forward fluid flow while bringing said measured variable to a desired value.

12. The control system of claim 11, wherein:

said primary controller, upon sensing a rapid decrease in the output of said faster-responding pump, automatically reconfigures the responsiveness of the slower-responding pump to give it the responsiveness of the former faster-responding pump.

13. A method of controlling a measured variable using a control system regulating the output of pumps piped in parallel and running in tandem, comprising:

sensing the measured variable;

controlling the output of at least two pumps, with one designated the lead pump and another designated the lag pump, with an individual controller on each pump;

providing different signals generated from said sensing to said controllers so that the output of the lead pump changes more quickly than any output change, if any, of the lag pump responsive to a change in said measured variable.

14. The method of claim 13, further comprising:

generating a plurality of signals responsive to said sensing;

putting one of said signals through a lag compensation block to slow down the response of its associated pump controller.

15. The method of claim 14, further comprising:

driving each pump with a turbine;

regulating input to each turbine with one of said controllers.

16. The method of claim 15, further comprising:

driving said turbines with steam;

controlling a flow valve supplying the steam to each turbine with one of said controllers.

17. The method of claim 13, further comprising:

providing a signal to the lag pump to slow down the response of its associated controller so that the pumps don't fight each other in an effort to correct output when holding a setpoint of the measured variable.

18. The method of claim 17, further comprising:

providing a signal to the lag pump to slow down the response of its associated controller so that when a substantial change in pump output is required, said lead pump quickly changes capacity, while the controller on said lag pump responds more slowly to maintain a reasonable forward fluid flow which controls the measured variable.

19. The method of claim 18, further comprising:

operating a minimum flow recycle valve on the lead pump as its output decreases;

taking the lead pump offline in response to operation of said minimum flow recycle valve;

maintaining automatic control of said measured variable with only the lag pump, which now operates in the position of lead pump without the lag compensation block.

20. The method of claim 14, further comprising:

sufficiently desensitizing the controller getting a signal from the lag compensation block so that the controllers don't fight each other in an effort to balance the required output between the pumps.

21. The method of claim 14, further comprising:

sufficiently desensitizing the controller getting a signal from the lag compensation block so that in response to a substantial change in the measured variable, the lead pump changes its capacity rapidly, while at the same time, the lag pump, while responding more slowly than the lead pump, is able to maintain a reasonable forward fluid flow and is also sufficiently sensitive to bring the measured variable to the desired value.

22. The method of claim 21, wherein:

sensitizing the lag pump automatically to respond more quickly in response to a substantial change in the measured variable on detection of significant output decline from the lead pump.

23. The method of claim 21, further comprising:

allowing a minimum flow recycle valve to open when the lead pump decreases its flow output to a predetermined value;

shutting off the lead pump;

eliminating the lag compensation block from the lag pump;

controlling the measured variable automatically with only the lag pump, now operating without the lag compensation block.

* * * * *